J. D. DE CELLE.
BEET HARVESTER.
APPLICATION FILED NOV. 16, 1908.
929,921.
Patented Aug. 3, 1909.
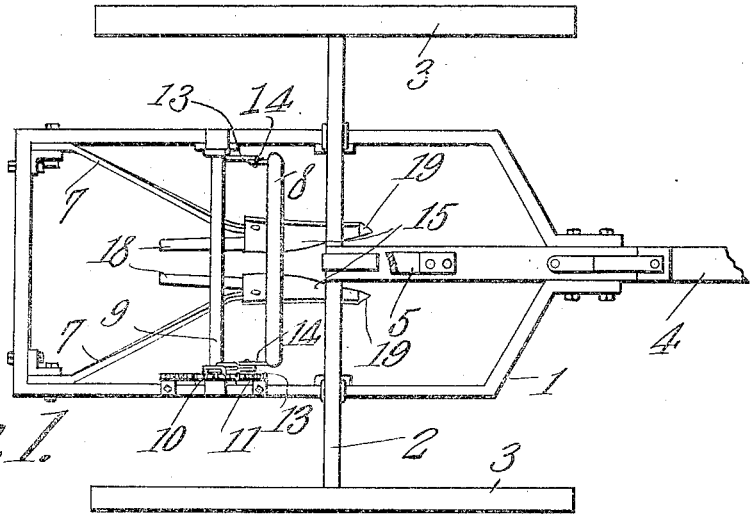
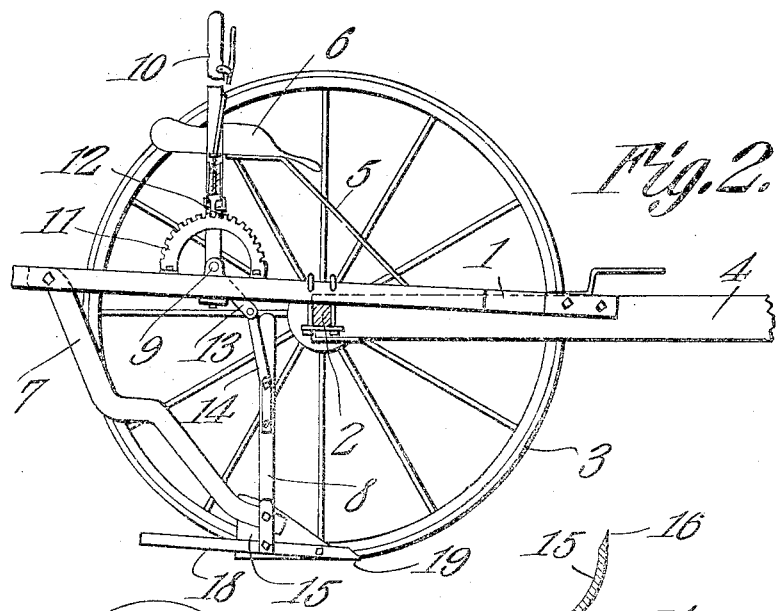
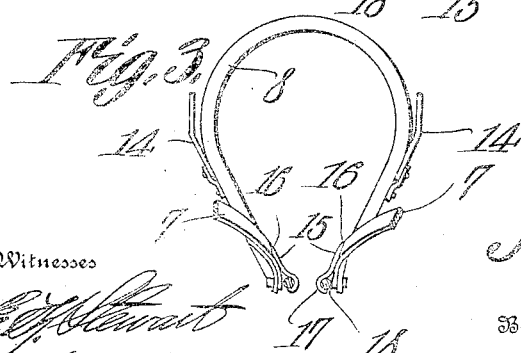
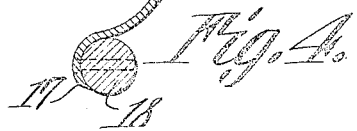
Inventor
Jerry D. DeCelle.
Witnesses
By
Attorneys

UNITED STATES PATENT OFFICE.

JERRY D. DE CELLE, OF FORT COLLINS, COLORADO.

BEET-HARVESTER.

No. 929,921.　　　　Specification of Letters Patent.　　　　Patented Aug. 3, 1909.

Application filed November 16, 1908. Serial No. 462,891.

*To all whom it may concern:*

Be it known that I, JERRY D. DE CELLE, a citizen of the United States, residing at Fort Collins, in the county of Larimer and State of Colorado, have invented a new and useful Beet-Harvester, of which the following is a specification.

This invention has relation to beet harvesters, and it consists in the novel construction and arrangement of its parts, as hereinafter shown and described.

The object of the invention is to provide a digging mechanism for a harvester of the character indicated, which, by reason of its peculiar configuration and arrangement, is especially adapted to encounter and elevate the roots above the surface of the soil as the implement is passed along a row.

The digger includes a wheel-mounted frame, to the rear portion of which are pivotally attached spaced standards. Shares of peculiar configuration are mounted at the lower portions of the said standards, and an arched yoke, of peculiar configuration, connects the lower forward portions of the said standards and the said shares together. The shares are preferably made of sheet metal, and are so mounted as to possess a certain amount of flex or resiliency, and, consequently, as the said shares engage the material, they acquire a certain amount of vibration, which facilitates the separation of the soil from the roots to be lifted. Rearwardly and upwardly inclined arms are attached at their forward end portions to the lower edge portions of the shares and are adapted to receive the roots from the said shares. The said arms are subjected to the vibration of the lower portions of the shares and complete the separation of the roots from the soil, and, at the same time, form guides whereby the roots are carried above the surface of the soil and deposited thereon.

A lever mechanism is mounted upon the frame of the implement and is operatively connected with the said yoke and the attached parts and may be used for raising the said shares above the surface of the soil, or for regulating the distance at which the same may operate below the surface of the soil.

In the accompanying drawings:—Figure 1 is a top plan view of the harvester. Fig. 2 is a side elevation of the same, with one wheel thereof removed. Fig. 3 is a rear elevation of the yoke and its attached parts, as used in the harvester. Fig. 4 is a vertical section of a share and rod used in the harvester.

The implement consists of the frame 1, which is mounted upon the axle 2, which, in turn, is mounted upon the supporting ground wheels 3. The tongue 4 is attached to the forward portion of the frame 1 and is provided with a seat post 5, upon which is mounted an operator's seat 6. The standards 7 are pivotally attached at their rear ends to the rear end portion of the frame 1 and at the opposite sides thereof. The forward portions of the said standards 7 are downwardly inclined and converge toward each other, as illustrated in Fig. 1 of the drawings. The arched yoke 8 is attached at its end portions to the lower forward ends of the standards 7, and is disposed over the forward end portions of the said standards. The shaft 9 is transversely journaled upon the frame 1 and is provided with a fixed operating lever 10. The gear segment 11 is mounted upon one of the side portions of the frame 1, and the lever 10 is provided with a pawl 12, which is adapted to engage the teeth of the segment 11. The arms 13 are disposed laterally with relation to the shaft 9 and are fixedly mounted upon the same. The links 14 pivotally connect the extremities of the arms 13 with the side portions of the yoke 8. The shares 15 are mounted at the end portions of the yoke 8 and at the lower forward ends of the standards 7. The said shares 15 are substantially ogee shaped in transverse section, as illustrated in Fig. 4 of the drawings, and are provided, at their upper edges, with the colter or cutting edges 16. The lower portions 17 of the said shares 15 are wrapped about the inner sides of the arms 18. The rear portions of the arms 18 project beyond the rear edges of the shares 15 and the forward end portions of the said arms 18 are continued into the sharpened bits 19, which project slightly in advance of the forward ends of the shares 15. The said arms 18 are slightly inclined in an upward direction from their forward end portions 19 toward their rear ends and are spaced one from the other at a sufficient distance to permit the soil to pass down between the said space but to prevent the roots from passing between the same.

From the above description it is obvious that, by operating the lever 10, the shaft 9 may be swung, whereby the yoke 8 and its attachments may be raised or lowered, and thus the shares 15 may be moved to a position above the surface of the soil, or may be adjusted at any desired distance below the surface of the soil.

As the implement passes along a row of roots, the shares 15 lie upon opposite sides of the row, and the bit ends 19 of the arms 18 penetrate under the surface of the soil and loosen the roots therein. The said roots eventually come back in contact with the inner surfaces of the shares 15, while the sharpened edges 16 of the said shares cleave the top soil. By reason of the fact that the said shares are mounted at the lower end portions of the standards 7 and the ends of the yoke 8, there is no direct transverse connection between the lower portions of the said parts, and, consequently, as the shares pass through the soil they may vibrate laterally to a degree sufficient to shake the loose soil from the roots, and to permit the loose soil to remain upon the surface of the ground, while the roots are elevated and forced back upon the rear end portions of the arms 18. The vibration to which the said shares are subjected is also transmitted to the said arms 18, and as the roots pass along the upper sides of the same, they are further shaken or agitated, whereby they are practically relieved of all soil, and, when they eventually fall from the ends of the arms 18, they are free of soil, and deposited upon the surface of the same. The yoke 8 forms a substantial brace for the lower forward portions of the standards 7, and prevents undue vibration at the forward ends of the said standards. At the same time, the area provided between the upper portions of the sides of the said yoke is sufficient to permit the foliage and stems of the plants to pass through without accumulating upon the said yoke.

Having described my invention, what I claim as new, and desire to secure, by Letters Patent, is:—

1. A beet harvester comprising spaced standards, spaced shares carried by the standards, said shares having their upper edges formed into colters, and an arch member connected at its ends with the shares.

2. A harvester comprising spaced standards, spaced shares attached to the standards and having their upper edges formed into colters, and mounted for lateral vibration, rearwardly disposed arms attached to the lower portions of the shares, and an arched yoke connected at its ends with the said shares.

3. A harvester comprising a frame, standards pivotally attached to the frame, a yoke connected at its ends to the lower forward end portions of the said standards, means mounted upon the frame for raising and lowering the said yoke, shares attached to the forward ends of the standards and having their upper edges sharpened, arms traversing the length of the shares and having their forward ends formed into bits, and projecting, at their rear end portions, beyond the rear edges of the shares.

In testimony that I claim the foregoing as my own, I have hereto affixed my signature in the presence of two witnesses.

JERRY D. DE CELLE.

Witnesses:
  CHAS. OLIVER,
  EMILY L. PROCTOR.